United States Patent
Naito et al.

(10) Patent No.: US 9,870,867 B2
(45) Date of Patent: Jan. 16, 2018

(54) CAPACITOR ANODE, SOLID ELECTROLYTIC CAPACITOR ELEMENT, SOLID ELECTROLYTIC CAPACITOR, AND METHOD FOR PRODUCING CAPACITOR ANODE

(71) Applicant: SHOWA DENKO K.K., Tokyo (JP)

(72) Inventors: Kazumi Naito, Tokyo (JP); Ryuichi Mitsumoto, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/323,812

(22) PCT Filed: Apr. 6, 2015

(86) PCT No.: PCT/JP2015/060720
§ 371 (c)(1),
(2) Date: Jan. 4, 2017

(87) PCT Pub. No.: WO2016/006290
PCT Pub. Date: Jan. 14, 2016

(65) Prior Publication Data
US 2017/0169957 A1    Jun. 15, 2017

(30) Foreign Application Priority Data
Jul. 9, 2014   (JP) .................. 2014-141485

(51) Int. Cl.
*H01G 9/15*   (2006.01)
*H01G 9/042*   (2006.01)
(Continued)

(52) U.S. Cl.
CPC .......... *H01G 9/042* (2013.01); *H01G 9/0036* (2013.01); *H01G 9/012* (2013.01); *H01G 9/052* (2013.01); *H01G 9/07* (2013.01); *H01G 9/15* (2013.01)

(58) Field of Classification Search
CPC ........ H01G 9/15; H01G 9/042; H01G 9/0036; H01G 9/012; H01G 9/052; H01G 9/07
See application file for complete search history.

(56) References Cited

U.S. PATENT DOCUMENTS

2007/0236867 A1* 10/2007 Hossick-Schott .... A61N 1/3956
                                                    361/523
2013/0277626 A1   10/2013 Naito
(Continued)

FOREIGN PATENT DOCUMENTS

JP   2004-349658 A   12/2004
JP   2009-038365 A    2/2009
(Continued)

OTHER PUBLICATIONS

International Search Report for PCT/JP2015/060720 dated Jun. 16, 2015 [PCT/ISA/210].

*Primary Examiner* — Dion R Ferguson
(74) *Attorney, Agent, or Firm* — Sughrue Mion, PLLC

(57) ABSTRACT

When forming a conductive polymer layer serving as a cathode of a solid electrolytic capacitor, in order to obtain a high capacitance even with a small number of times of polymerization treatments, a capacitor anode according to the present invention includes a tungsten sintered body (2) and is provided with a dielectric film (1), and in which vanadium oxide is deposited on the surface of the dielectric film (1).

10 Claims, 3 Drawing Sheets

(51) Int. Cl.
*H01G 9/052* (2006.01)
*H01G 9/07* (2006.01)
*H01G 9/00* (2006.01)
*H01G 9/012* (2006.01)

(56) References Cited

U.S. PATENT DOCUMENTS

2014/0233154 A1\* 8/2014 Naito ............... H01G 9/052
 361/500
2014/0293512 A1\* 10/2014 Tanaka ............. H01G 9/032
 361/525

FOREIGN PATENT DOCUMENTS

JP 2010-245115 A 10/2010
WO 2012/086272 A1 6/2012

\* cited by examiner

US 9,870,867 B2

CAPACITOR ANODE, SOLID ELECTROLYTIC CAPACITOR ELEMENT, SOLID ELECTROLYTIC CAPACITOR, AND METHOD FOR PRODUCING CAPACITOR ANODE

CROSS REFERENCE TO RELATED APPLICATIONS

This application is a National Stage of International Application No. PCT/JP2015/060720 filed Apr. 6, 2015, claiming priority based on Japanese Patent Application No. 2014-141485 filed Jul. 9, 2014, the contents of all of which are incorporated herein by reference in their entirety.

TECHNICAL FIELD

The present invention relates to a capacitor anode, a solid electrolytic capacitor element, a solid electrolytic capacitor, and a method for producing a capacitor anode.

Priority is claimed on Japanese Patent Application No. 2014-141485, filed Jul. 9, 2014, the content of which is incorporated herein by reference.

BACKGROUND ART

A solid electrolytic capacitor element is constituted of an anode body including a conductive material such as a sintered body of a valve action metal powder, a dielectric layer of a metal oxide formed on the surface by subjecting the surface layer of the anode body to electrolytic oxidation in an aqueous solution of an electrolyte such as phosphoric acid, and a solid cathode layer (semiconductor layer) composed of a conductive polymer formed thereon by electrolytic polymerization or the like.

For example, in Patent Document 1, an electrolytic capacitor using tantalum, niobium, titanium, aluminum, hafnium, zirconium or the like as a valve action metal has been described. For example, in Patent Document 2, an electrolytic capacitor using niobium as a valve action metal has been described.

In addition to the valve action metals listed above, for example, in Patent Document 3, an electrolytic capacitor using a sintered body of tungsten powder has been described. The electrolytic capacitor using a sintered body of tungsten powder is capable of obtaining a large capacitance as compared with the electrolytic capacitor using a sintered body of another valve action metal. On the other hand, the electrolytic capacitor using a sintered body of tungsten powder has been studied, since there are problems such as cracking of the coating film in the chemical conversion step and a large leakage current.

CITATION LIST

Patent Documents

[Patent Document 1] Japanese Unexamined Patent Application, First Publication No. 2010-245115

[Patent Document 2] Japanese Unexamined Patent Application, First Publication No. 2009-38365

[Patent Document 3] Japanese Unexamined Patent Application, First Publication No. 2004-349658

SUMMARY OF INVENTION

Technical Problem

Improvements have been made to the problem of cracking of the coating film in the chemical conversion step and the problem of a large leakage current by improving the chemical conversion conditions and the tungsten materials. However, with the solid electrolytic capacitor element using a sintered body of tungsten, there is a problem in that it takes time to obtain a sufficient layer thickness during electrolytic polymerization when forming the semiconductor layer. Sufficient improvements have not been made to this problem.

The semiconductor layer can be formed uniformly to pore surfaces inside the sintered body by performing electrolytic polymerization a plurality of times. However, with the solid electrolytic capacitor element using a sintered body of tungsten, it was not possible to obtain a sufficient layer thickness unless the frequency of the electrolytic polymerization is increased. Because it takes at least one hour for one treatment, the electrolytic polymerization treatment has a problem in productivity.

If the number of times of the electrolytic polymerization treatment is reduced in view of the productivity, there has been a problem in that semiconductor layers cannot be densely formed to obtain a sufficient capacitance.

The present invention has been developed in light of the above circumstances, and has an object of obtaining a capacitor anode, a solid electrolytic capacitor element, and a solid electrolytic capacitor that can obtain a high capacitance even with a small number of times of treatments, and a method for producing a capacitor anode.

Solution to Problem

As a result of intensive studies, by depositing vanadium oxide on the surface of a dielectric film formed on the surface of a capacitor anode including a tungsten sintered body, the inventors of the present invention have found a capacitor anode that can obtain a high capacitance even with a small number of times of electrolytic polymerization treatments, a solid electrolytic capacitor element, a solid electrolytic capacitor, and a method for producing a capacitor anode.

That is, the present invention includes the following configurations.

(1) A capacitor anode according to one aspect of the present invention is a capacitor anode including a tungsten sintered body and provided with a dielectric film on the surface, and in which vanadium oxide is deposited on the surface of the dielectric film.

(2) The capacitor anode according to the above (1), in which the vanadium oxide may be divanadium pentoxide.

(3) The capacitor anode according to the above (1) or (2), in which a content of vanadium element may be from 0.002 to 0.2% by mass with respect to the total content of vanadium element and tungsten element.

(4) The capacitor anode according to any one of the above (1) to (3), in which the vanadium oxide may be deposited within a range from the surface of the dielectric film to 5 nm.

(5) The capacitor anode according to any one of the above (1) to (4), in which at least a portion of the tungsten sintered body may be silicified.

(6) A solid electrolytic capacitor element according to one aspect of the present invention, in which a semiconductor layer is further laminated on top of a dielectric film of the capacitor anode according to any one of the above (1) to (5).

(7) A solid electrolytic capacitor according to an aspect of the present invention includes the solid electrolytic capacitor element according to the above (6).

(8) A method for producing a capacitor anode according to one aspect of the present invention includes a deposition step for depositing vanadium oxide on a surface of a dielectric film of a capacitor anode including a tungsten sintered body and provided with the dielectric film on the surface.

(9) The method for producing a capacitor anode according to the above (8), in which the deposition step may have an immersion step for immersing the tungsten sintered body after a chemical conversion step in an aqueous solution obtained by dissolving vanadium oxide, and a drying step for drying the tungsten sintered body after immersion.

(10) The method for producing a capacitor anode according to the above (9), in which the drying step may have a first drying step performed at a temperature of 100° C. to 120° C., and a second drying step performed at a temperature of 190° C. to 300° C.

Advantageous Effects of Invention

It is possible to obtain a capacitor anode that can obtain a high capacitance even with a small number of times of polymerization treatments when forming a conductive polymer layer serving as a cathode of the solid electrolytic capacitor, a solid electrolytic capacitor element, a solid electrolytic capacitor, and a method for producing a capacitor anode.

DESCRIPTION OF EMBODIMENTS

Figure 1:
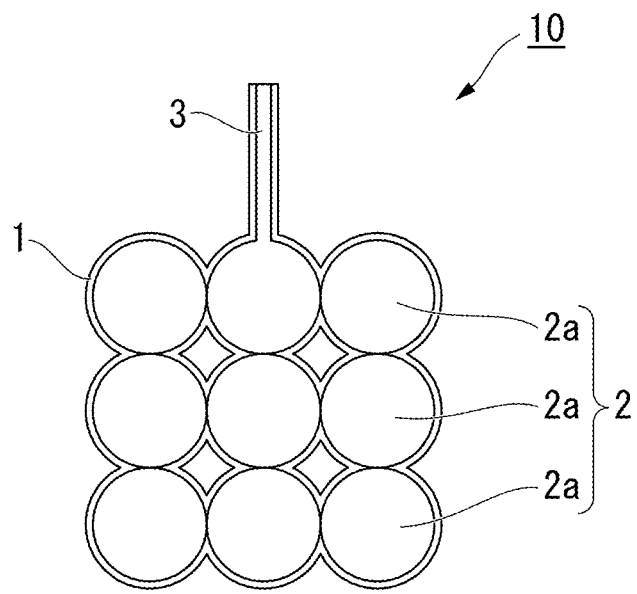
FIG. 1 is a schematic sectional view of a capacitor anode according to an embodiment of the present invention.

A capacitor anode, a solid electrolytic capacitor element and a solid electrolytic capacitor employing the present invention will be described below in detail with appropriate reference to the drawings.

In the drawings used in the following description, characteristic portions and components may be shown in an enlarged manner in some cases for the sake of simplicity in order to facilitate understanding of the characteristics of the present invention, and the dimensional ratio or the like of each constituent element may be different from that employed in reality. Materials, dimensions, and the like illustrated in the following description are merely examples, and the present invention is not limited thereto and can be carried out with appropriate modifications without departing from the gist of the invention.

[Capacitor Anode]

Figure 2:
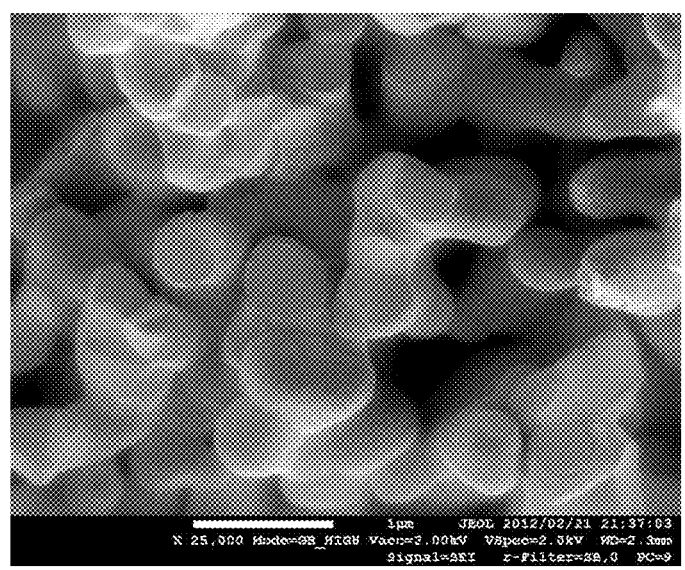
FIG. 2 is an image of the cross section of the capacitor anode according to an embodiment of the present invention which is taken by a scanning electron microscope (SEM).

FIG. 1 is a schematic sectional view of a capacitor anode according to an embodiment of the present invention. FIG. 2 is an image obtained by enlarging the cross section of the capacitor anode according to an embodiment of the present invention by 25,000 times using a scanning electron microscope (SEM).

A capacitor anode 10 of the present invention includes a tungsten sintered body 2 having a dielectric film 1. Vanadium oxide is deposited onto the surface of the dielectric film 1 (not shown). The tungsten sintered body 2 is composed of a plurality of tungsten powders 2a. The tungsten powders 2a are in contact with each other and electrically connected. An anode lead wire 3 is connected inside the tungsten sintered body 2. Since the tungsten powders 2a are electrically connected to each other, the electricity energized from the anode lead wire 3 can be spread throughout the tungsten sintered body.

Here, the expression "dielectric film surface" means the surface of the dielectric film formed on the outer surface of the tungsten sintered body and the pore surface inside the tungsten sintered body. As described later, this is because the dielectric film is formed on the outer surface of the tungsten sintered body, as well as on the pore surface inside the tungsten sintered body.

Vanadium oxide is deposited on the surface of the dielectric film 1. By depositing vanadium oxide onto the surface of the dielectric film 1, it is possible to densely form a semiconductor layer formed on the dielectric film 1. That is, by using this capacitor anode 10, it is possible to increase the capacitance of the solid electrolytic capacitor.

The dielectric film 1 is obtained by oxidizing the tungsten sintered body 2 by a chemical conversion treatment and contains tungsten oxide ($WO_3$). A semiconductor layer is difficult to form and is impossible to form densely with the solid electrolytic capacitor using a tungsten sintered body. It is thought that this is because this tungsten oxide causes some kind of adverse effect. On the other hand, when depositing vanadium oxide to the dielectric film 1, a semiconductor layer can be densely formed although the cause for this is not clear.

Here, the expression regarding the "deposition of vanadium oxide" means that traces of vanadium oxide are dispersed and deposited near the surface of the dielectric film 1, rather than vanadium oxide being formed as a layer on the dielectric film 1.

This vanadium oxide can be measured by observing the peak derived from the vanadium oxide in the vicinity of 516 eV in the photoelectron spectrum of V2p3/2 electrons by employing X-ray photoelectron spectroscopy (Quantera II, manufactured by ULVAC-PHI, Inc.), with an Al Kα X-ray source under conditions of 25 W and 15 kV. When measured by etching the surface of the tungsten sintered body in which vanadium oxide is deposited on the dielectric film surface by Ar sputtering, vanadium oxide was measured within a range from the dielectric film surface up to about 5 nm.

Specific measurement conditions for the X-ray photoelectron spectroscopy are shown below.

Apparatus: Quantera II (manufactured by ULVAC-PHI, Inc.)

X-ray: Al monochrome, beam diameter of 100 μm, 25 W, 15 kV

Analysis area: diameter of 100 μm, electron/ion neutralization gun: used, photoelectron take-off angle: 45 degrees

[Measurement Conditions]

Narrow Scan

Pass Energy: 112 eV, Step: 0.2 eV, Dwell: 20 ms

Sweep time: 200 ms

The binding energy correction was performed using the C—C peak of C1s spectrum at 284.6 eV as a reference.

On the other hand, when the mapping analysis was attempted by employing Auger electron spectroscopy (AES) analysis (PHI-680, manufactured by ULVAC-PHI Inc.) under conditions of an electron beam of 10 kV and 10 nA, the presence of vanadium oxide could not be observed. It is thought that since the Auger electron peak derived from vanadium was adjacent to the Auger electron peak derived from oxygen, the background became high, making it impossible to detect the trace amount of vanadium.

In other words, the above expression means that a trace amount of vanadium oxide is deposited within the range up to 5 nm from the surface of the dielectric film which can be measured by X-ray photoelectron spectroscopy under the above conditions, but cannot be measured by the mapping analysis of Auger electron spectroscopy under the above conditions.

As described above, the chemical conversion treatment also forms the substantially uniform dielectric film 1 on the pore surface inside the tungsten sintered body. For this reason, although the portion which is measured directly as the "surface of the tungsten sintered body" is actually the "outer surface of the tungsten sintered body", it can also be read to measure the "pore surface inside the tungsten sintered body".

The vanadium oxide deposited at this time is not particularly limited. There are several forms of vanadium oxide having a valence of two (divalence), three (trivalence), four (tetravalence) or five (pentavalence), and a single type of these forms may be present alone or a plurality types of these forms may be mixed. Among them, divanadium pentoxide ($V_2O_5$) having a valence of five (pentavalence) is preferred. Divanadium pentoxide is preferred because it is stable and can be treated quantitatively. Due to the nature of the deposition operation which will be described later, divanadium pentoxide that is generally distributed is preferred.

The content of vanadium element is preferably from 0.002 to 0.2% by mass, more preferably from 0.002 to 0.1% by mass, and still more preferably from 0.002 to 0.025% by mass, with respect to the total content of vanadium element and tungsten element.

If the content of vanadium element is equal to or more than 0.002% by mass with respect to the total content of vanadium element and tungsten element, when the capacitor anode 10 is used in a solid electrolytic capacitor, a semiconductor layer can be densely formed easily, and there is a tendency that the capacitance of the electrolytic capacitor can be increased. In particular, also from the examples described later, when the content of vanadium element exceeds 0.01% by mass, the capacitance sufficiently reaches saturation.

Although the dielectric constant of vanadium oxide is small compared to that of tungsten oxide, if the content of vanadium element is not more than 0.2% by mass with respect to the total content of vanadium element and tungsten element, it is easy to maintain a large capacitance of the solid electrolytic capacitor.

That is, if it is within the above range, it is easy to increase the capacitance of the solid electrolytic capacitor.

Quantitative analysis of vanadium element can be carried out by a calibration curve method using Co as an internal standard. More specifically, the quantitative determination can be carried out using an ICP mass spectrometer by dissolving the tungsten sintered body 2 having the dielectric film 1 onto which vanadium oxide has been deposited by heating at 60° C. in an aqueous fluonitric acid solution, and adding a standard solution thereto which is equivalent to 10 ng of Co. In addition to this process, the quantitative determination can also be carried out by dissolving only the dielectric film 1 onto which vanadium oxide has been deposited, out of the tungsten sintered body 2 having the dielectric film 1 onto which vanadium oxide has been deposited, using an aqueous ammonia solution.

The tungsten sintered body 2 can be obtained by sintering and molding the tungsten powder 2a.

The tungsten sintered body 2 has pores. By having internal pores, the specific surface area of the dielectric film 1 to be formed is increased. That is, it is possible to increase the capacitance of the solid electrolytic capacitor employing the capacitor anode 10.

For the tungsten powder 2a as the raw material, those that are commercially available can be used. It is preferable to use a tungsten powder having a small particle size. The tungsten powder 2a having a smaller particle size can be obtained, for example, by pulverizing a tungsten oxide powder in a hydrogen atmosphere. In addition, it may also be obtained from tungstic acid and its salts (ammonium tungstate or the like) or tungsten halide by using a reducing agent such as hydrogen or sodium and appropriately selecting the reduction conditions. Furthermore, it may also be obtained from tungsten-containing minerals directly or through several steps by selecting the reduction conditions.

The tungsten powder 2a as the raw material preferably has a 50% particle diameter (D50) in a volume-based cumulative particle size distribution of 0.1 to 1 μm. The tungsten powder 2a may be a non-granulated powder (hereinafter, also referred to as a "primary powder") or may be a granulated powder which is granulated. It is preferable to use a granulated powder because pores are easily formed in the capacitor anode. The granulated powder may be obtained by, for example, adjusting the pore distribution by a method similar to the method about a niobium powder which is disclosed in Japanese Unexamined Patent Application, First Publication No. 2003-213302.

It is preferable that at least a portion of the tungsten sintered body 2 is silicified.

As a method for obtaining a partially silicified tungsten sintered body, for example, a method using a partially silicified tungsten powder as a raw material, or a method in which a silicon powder is thoroughly mixed, and reacted during sintering, with the tungsten powder 2a can be mentioned. When at least a portion of the tungsten sintered body 2 is silicified, the content of silicon element is preferably from 0.05 to 7% by mass and more preferably from 0.2 to 4% by mass with respect to that of tungsten element.

If the content is within this range, it is possible to suppress the leakage current (LC) of the solid electrolytic capacitor element using the tungsten sintered body 2 to a low level.

As the tungsten powder, those further having either one or both of tungsten carbide and tungsten boride on a portion of the surface are also preferably used. Those containing nitrogen on a portion of the surface of the tungsten powder are also preferably used.

[Solid Electrolytic Capacitor Element, Solid Electrolytic Capacitor]

Figure 3:
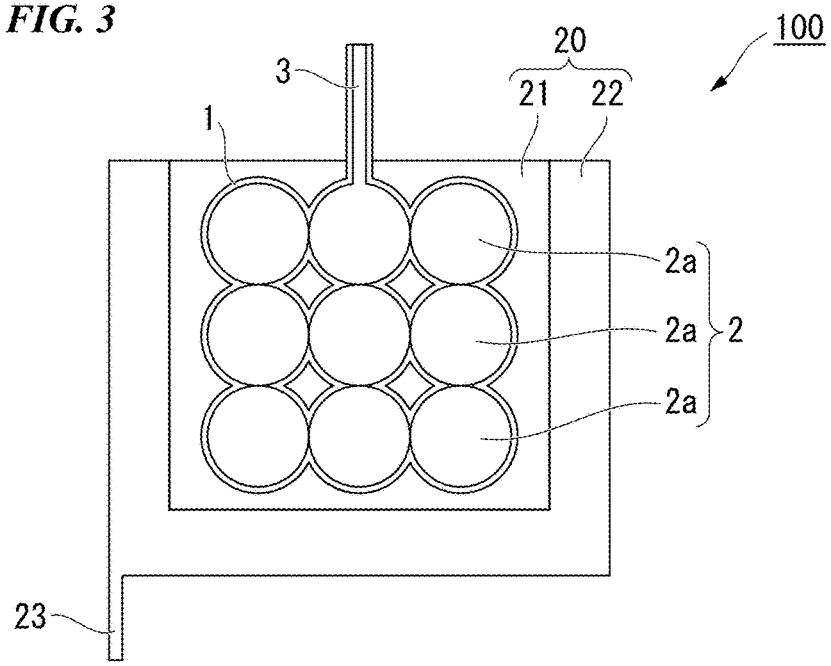
FIG. 3 is a schematic sectional view of a solid electrolytic capacitor element according to an embodiment of the present invention.

FIG. 3 is a schematic sectional view schematically illustrating a solid electrolytic capacitor element of the present invention. A solid electrolytic capacitor element 100 shown in FIG. 3 is arranged in such a manner that a counter electrode (cathode) 20 covers the capacitor anode described above, and functions as a solid electrolytic capacitor element by the dielectric film 1. The counter electrode 20 is composed of a semiconductor layer 21 and an electrical conductor layer 22. The counter electrode 20 is electrically connected to the outside by a cathode lead wire 23. The electrical conductor layer 22 is formed in order to improve the electrical connection with the cathode lead wire 23 and may be removed.

Although the semiconductor layer 21 and the electrical conductor layer 22 are not particularly limited, those that are commonly used can be employed.

As described above, since vanadium oxide is deposited on the surface of the dielectric film 1 of the capacitor anode, it is possible to densely form the semiconductor layer 21. Therefore, it is possible to increase the capacitance of the solid electrolytic capacitor element 100.

Figure 4:
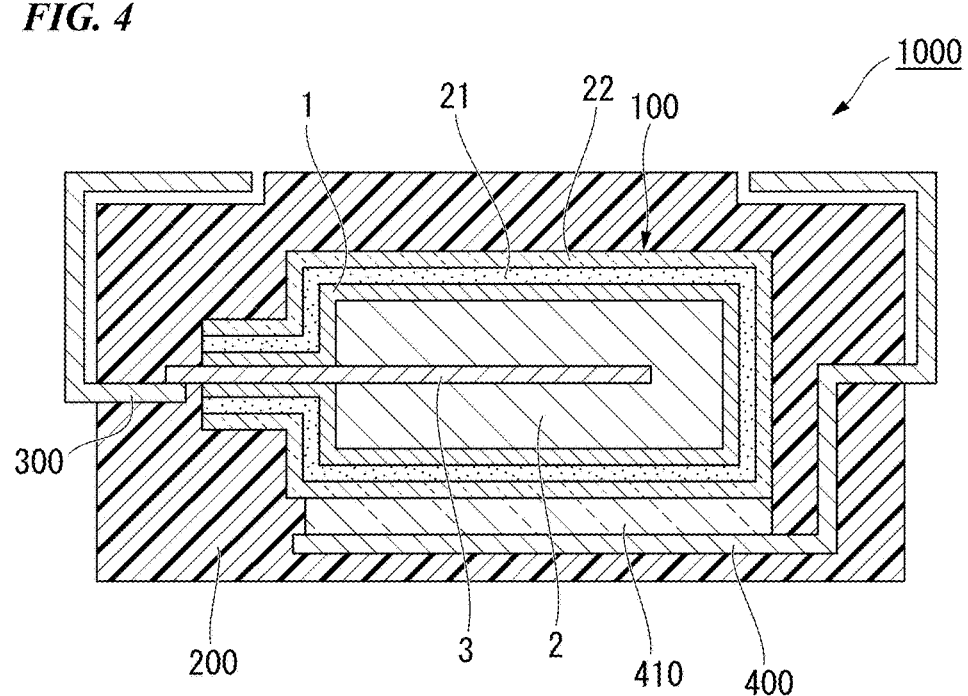
FIG. 4 is a schematic sectional view schematically illustrating a solid electrolytic capacitor according to an embodiment of the present invention.

FIG. 4 is a schematic sectional view schematically illustrating a solid electrolytic capacitor of the present invention. A solid electrolytic capacitor 1,000 includes the above-mentioned solid electrolytic capacitor element 100. For example, as shown in FIG. 4, it is possible to configure so that an anode lead wire 3 of the solid electrolytic capacitor element 100 is connected to an anode terminal 300, the electrical conductor layer 22 is connected to a cathode terminal 400 through a conductive adhesive layer 410, and these are covered with a resin sheath 200 except for a portion of the anode terminal 300 and cathode terminal 400. The conductive adhesive layer 410 may be replaced with the cathode lead wire 23. Due to the resin sheath 200, the solid electrolytic capacitor element 100 can be prevented from being affected from the outside. A plurality of solid electrolytic capacitor elements can also be functioned as a single solid electrolytic capacitor by being placed in parallel and aligned in one direction.

[Method for Producing Capacitor Anode and Solid Electrolytic Capacitor]

First, a capacitor anode is produced. The term "capacitor anode" used herein is in a state before the addition of the dielectric film, and may be a tungsten sintered body itself to be described later, or may be one obtained by processing a tungsten sintered body, for example, by adding an anode extraction lead to the tungsten sintered body. The tungsten sintered body can be obtained by sintering and molding a tungsten powder, and can be produced by a commonly used method. The tungsten powder constituting the tungsten sintered body can be produced by the method described above.

Next, a dielectric film is formed on the surface of the capacitor anode by a chemical conversion treatment. A commonly used method can be used for the chemical conversion treatment. For example, the chemical conversion treatment is carried out by immersing the capacitor anode in an electrolytic fluid while limiting the amount of current. Examples of the electrolyte in the electrolytic fluid include nitric acid, sulfuric acid and ammonium persulfate.

In general, the chemical conversion treatment is started at a constant current and the constant voltage process continues when the voltage reached a preset chemical conversion voltage, and the end point of the chemical conversion treatment is defined as a point where the amount of current is reduced to a certain value.

Then, vanadium oxide is deposited on the dielectric film surface of the capacitor anode in which the dielectric film has been formed. The deposition of vanadium oxide is preferably realized by a method of immersing the capacitor anode in an aqueous solution in which vanadium oxide is dissolved, and then drying the capacitor anode after immersion. By drying the capacitor anode after this immersion process, vanadium oxide is uniformly deposited not only on the outer surface of the capacitor anode, but also on the internal pore surface.

When the capacitor anode after the chemical conversion treatment in which the dielectric film is formed is immersed in an aqueous solution obtained by dissolving vanadium oxide, the aqueous solution obtained by dissolving vanadium oxide is preferably neutral. If the aqueous solution is neutral, less damage is inflicted on the dielectric film. However, even if it was an acidic solution like an aqueous ammonium persulfate solution, it can be preferably used as long as it is an oxidizing solution. Although the solubility of vanadium oxide in water is not high, from the viewpoint of depositing a sufficient amount at low cost, an aqueous solution obtained by dissolving divanadium pentoxide is preferred. The concentration of the aqueous solution of divanadium pentoxide is preferably from 0.05 to 0.5% by mass.

The temperature of the aqueous solution at the time of immersing the capacitor anode after the chemical conversion treatment in the aqueous solution of divanadium pentoxide is preferably from 20° C. to 60° C., more preferably from 25° C. to 50° C., and still more preferably from 30° C. to 50° C. The immersion time in the aqueous solution of divanadium pentoxide is determined from preliminary experiments in consideration of the size of the anode body or the like. When performing the immersion process, it is preferably carried out in a state where the aqueous solution is stirred with a stirrer or the like from the viewpoint of keeping the concentration uniform.

For the drying of the capacitor anode on which vanadium oxide is deposited by the immersion process, if the solvent is water, it may be removed at room temperature under reduced pressure, or may be evaporated by heating. The atmosphere may be an air atmosphere, or may be an Ar or $N_2$ atmosphere. From the viewpoint of manufacturing cost, the drying process is preferably performed in an air atmosphere.

The drying step preferably has a first drying step performed at a temperature of 100° C. to 120° C., and a second drying step performed at a temperature of 190° C. to 300° C. By performing the first drying step at a temperature of 100° C. to 120° C., it is possible to remove any adhered moisture. It is preferable to carry out the second drying process at a temperature of 190° C. to 300° C.

By going through the above method, it is possible to produce a capacitor anode having a dielectric film on the surface, and in which vanadium oxide is deposited on the dielectric film surface. By forming a semiconductor layer on the dielectric film of the obtained capacitor anode, it is possible to obtain a solid electrolytic capacitor element. An electrical conductor layer may be further formed in order to improve the electrical connection with the cathode lead wire.

The semiconductor layer serving as a cathode of the solid electrolytic capacitor element obtained as described above can generally be constituted by an inorganic semiconductor such as manganese dioxide or an organic semiconductor such as a conductive polymer doped with a dopant. In order to obtain a solid electrolytic capacitor element with a low equivalent series resistance (ESR), it is preferable to carry out a polymerization process on the anode body having a dielectric film to form a conductive polymer layer as the semiconductor layer.

Here, the polymerization process can be carried out by a chemical polymerization method, an electrolytic polymerization method by an external electrode, an electrolytic polymerization method by an energizing means to the anode body, or a combination thereof.

By using the capacitor anode of the present invention, it is possible to shorten the time required for forming the semiconductor layer. More specifically, for example, if chemical polymerization and electrolytic polymerization are carried out on several separate occasions so that the pores in the capacitor anode are not blocked, at least one hour is required for one set of chemical polymerization and electrolytic polymerization treatments. In other words, it is possible to greatly improve the productivity by merely reducing the number of times of treatments by one.

The electrical conductor layer is not particularly limited, and carbon, silver, or the like exhibiting high conductivity is often used. The production method thereof is not particularly limited. For example, the electrical conductor layer can be produced by solidifying carbon or silver in the form of a paste. In addition, carbon or silver may be laminated and used as the electrical conductor layer.

Finally, in the obtained solid electrolytic capacitor element, the anode lead wire and the cathode lead wire are electrically connected to an external anode terminal and an external cathode terminal, respectively, and then covered with a resin sheath. It is possible to obtain a solid electrolytic capacitor by going through these steps.

EXAMPLES

The present invention will be described below in more detail based on Examples. The present invention is not limited only to these Examples.

Examples 1 to 4, Comparative Examples 1 and 2

A commercially available tungsten powder having a 50% particle size of 0.5 μm was subjected to vacuum heating at 1,350° C. for 30 minutes.

After returning to room temperature, a lumpy material was taken out, pulverized, and then the 26 to 180-μm fraction was classified by sieving to obtain a granulated powder having an average particle size of 65 μm.

The granulated powder was molded using a TAP2 molding machine manufactured by Seiken Co., Ltd. A tantalum wire having a diameter of 0.40 mm was implanted as an anode lead. The molded body was subjected to vacuum sintering at 1,450° C. for 20 minutes to obtain 500 pieces of tungsten sintered bodies having a size of 1.0×2.8×4.3 mm (the lead wire was implanted on a 1.0×2.8 mm surface). The mass of the tungsten sintered bodies excluding the wires was 105±3 mg.

Then, the tungsten sintered body was immersed in a 4% by mass aqueous solution of ammonium persulfate to a position just enough to immerse the entire sintered body, and was subjected to a chemical conversion treatment for 3 hours at 10° C. and 10 V, thereby forming a dielectric film of tungsten oxide on the surface and on the surface inside the pores of the tungsten sintered body. This was followed by washing with water, washing with ethanol, and then drying for 30 minutes at 105° C.

Subsequently, the tungsten sintered bodies that had been subjected to the chemical conversion treatment were immersed into aqueous divanadium pentoxide solutions of various concentrations described in Table 1. The immersion process was carried out for 15 minutes while keeping the liquid temperature at 30° C. and stirring with a stirrer. Then, the tungsten sintered bodies were pulled up from the aqueous solution, dried for 15 minutes at 105° C., and then dried for 30 minutes at 190° C. by raising the temperature, thereby depositing vanadium oxide (mainly, divanadium pentoxide) on the dielectric film surface.

The capacitor anode that had been subjected to the deposition operation was dissolved by heating at 60° C. in an aqueous fluonitric acid solution obtained by mixing 0.5 ml of 48% hydrofluoric acid (HF) (special grade product, manufactured by Kanto Chemical Co., Inc.) and 0.5 ml of 68% nitric acid ($HNO_3$) (ultra-high purity product, manufactured by Kanto Chemical Co., Inc.), and the resulting mixture was then made up to 30 ml by adding water thereto. 0.5 ml of the resulting mixture was collected from the resulting mixture that water added, a standard solution equivalent to 10 ng of Co was added thereto to make up to 10 ml ($Co/HNO_3$ (0.1 mol/l) solution manufactured by Kanto Chemical Co., Inc.), and quantitative determination was carried out using the ICP-MS7500 manufactured by Agilent Technologies, Inc. The mass ratio of vanadium element relative to a total mass of vanadium element and tungsten element was calculated and also shown in Table 1.

The capacitor anode that had been subjected to the aforementioned deposition operation, and which was other than those used for the quantitative analysis of vanadium element was immersed in a 10% by mass 3,4-ethylenedioxythiophene ethanol solution, pulled up therefrom, and immersed in a 5% by mass aqueous solution of iron (III) toluenesulfonate of 60° C. which was prepared separately for 10 minutes to allow a polymerization reaction to proceed. The operation up to this point from the operation of immersing in the 3,4-ethylenedioxythiophene ethanol solution was further repeated twice (a total of 3 times).

Furthermore, the capacitor anode was immersed in a monomer solution (10% by mass 3,4-ethylenedioxythiophene ethanol solution), and then soaked in a solution obtained by dissolving saturated 3,4-ethylenedioxythiophene and 3% by mass of anthraquinone sulfonic acid that were prepared separately (solvent was a mixed solvent of 70 parts by mass of water and 30 parts by mass of ethylene glycol), and the electrolytic polymerization was carried out at room temperature for 60 minutes at a current value of 60 μA for each capacitor anode. The resultant was pulled up from the liquid, washed with water, washed with ethanol, dried at 80° C., and then further subjected to a post-conversion treatment for 15 minutes at 7 V in the chemical conversion solution. This step was repeated a plurality of times to form a semiconductor layer composed of a conductive polymer. The second to third round of the electrolytic polymerization at this time was carried out at a current value of 70 μA for each anode body, and the electrolytic polymerization from the fourth round and onward was carried out at a current value of 80 pA for each anode body. The number of a series of operations for forming a semiconductor layer including the impregnation with the monomer solution, the electrolytic polymerization and the post-conversion treatment is described in Table 1.

Subsequently, a carbon layer and a silver layer formed by solidification of a silver paste were sequentially laminated excluding a surface on the semiconductor layer where the lead wire was implanted to prepare 64 solid electrolytic capacitor elements for each example.

Examples 5 to 8, Comparative Examples 3 and 4

64 solid electrolytic capacitor elements were prepared for each example in the same manner as in Example 1 with the exceptions that when producing a granulated powder in Example 1, an anode body was prepared by mixing a commercially available silicon powder having a 50% particle size of 1 μm with 0.8% by mass of a tungsten powder, and after performing the deposition operation of vanadium oxide, before being immersed in the 3,4-ethylenedioxythiophene ethanol solution, the anode body following the aforementioned deposition operation was immersed in a 1.5% by mass aqueous manganese nitrate solution and then reacted for 15 minutes at 200° C. to form a manganese dioxide layer (the layer may not be uniformly formed, and may be scattered about in some parts). By mixing silicon, a portion of the surface layer of the granulated powder was formed as an alloy of tungsten and silicon.

The average capacitance of 64 elements in each Example (120 Hz, bias 2V) and the value obtained for the mass of the semiconductor layer from an average of 10 elements formed up to the semiconductor layer (difference in the mass of the anode body before and after the formation of the semiconductor layer) in the same manner as in each example are both described in Table 1.

TABLE 1

| | Concentration of aqueous divanadium pentoxide solution (% by mass) | Number of operations for formation of semiconductor layer composed of conductive polymer (times) | Mass of semiconductor layer (mg) | Capacitance (μF) | V/(V + W)*1 (mass ppm) |
|---|---|---|---|---|---|
| Ex. 1 | 0.05 | 6 | 3.2 | 463 | 26 |
| Ex. 2 | 0.5 | 6 | 3.4 | 477 | 248 |
| Ex. 3 | 0.1 | 6 | 3.4 | 473 | 60 |
| Ex. 4 | 0.1 | 7 | 3.5 | 474 | 56 |
| Comp. Ex. 1 | 0 | 6 | 2.6 | 397 | 0.4 |
| Comp. Ex. 2 | 0 | 7 | 3.5 | 477 | 0.3 |
| Ex. 5 | 0.05 | 6 | 3.8 | 505 | 29 |
| Ex. 6 | 0.5 | 6 | 4.2 | 517 | 238 |
| Ex. 7 | 0.2 | 6 | 4.1 | 513 | 105 |
| Ex. 8 | 0.2 | 7 | 4.1 | 516 | 115 |
| Comp. Ex. 3 | 0 | 6 | 2.8 | 412 | 0.3 |
| Comp. Ex. 4 | 0 | 7 | 4.0 | 511 | 0.4 |

*1Mass ratio of vanadium element relative to the total of vanadium element and tungsten element For example, when comparing Examples 1 to 3 and Comparative Example 1 or Examples 5 to 7 and Comparative Example 3, if the capacitor anode that had been subjected to the deposition operation of vanadium oxide was used, compared to the case of using the capacitor anode that had not been subjected to the deposition operation of vanadium oxide, it is possible to obtain a solid electrolytic capacitor element in which the mass of the semiconductor layer is large and the capacitance is high.

When comparing Comparative Example 1 and Comparative Example 2 or Comparative Example 3 and Comparative Example 4, it is clear that even when using a capacitor anode that has not been subjected to the deposition operation of vanadium oxide, a solid electrolytic capacitor element having a sufficient capacitance can be produced by increasing the number of a series of electrolytic polymerization operations. In other words, by performing the deposition operation of vanadium oxide, it is possible to reduce the number of a series of electrolytic polymerization operations.

When comparing Example 3 with Example 4 and Example 7 with Example 8, it is apparent that even when the number of the deposition operations of vanadium oxide is further increased with respect to the capacitor anode that had already been converted by being subjected to the deposition operation of vanadium oxide and sufficiently formed with the semiconductor layer, the capacitance does not change at all.

Figure 5:
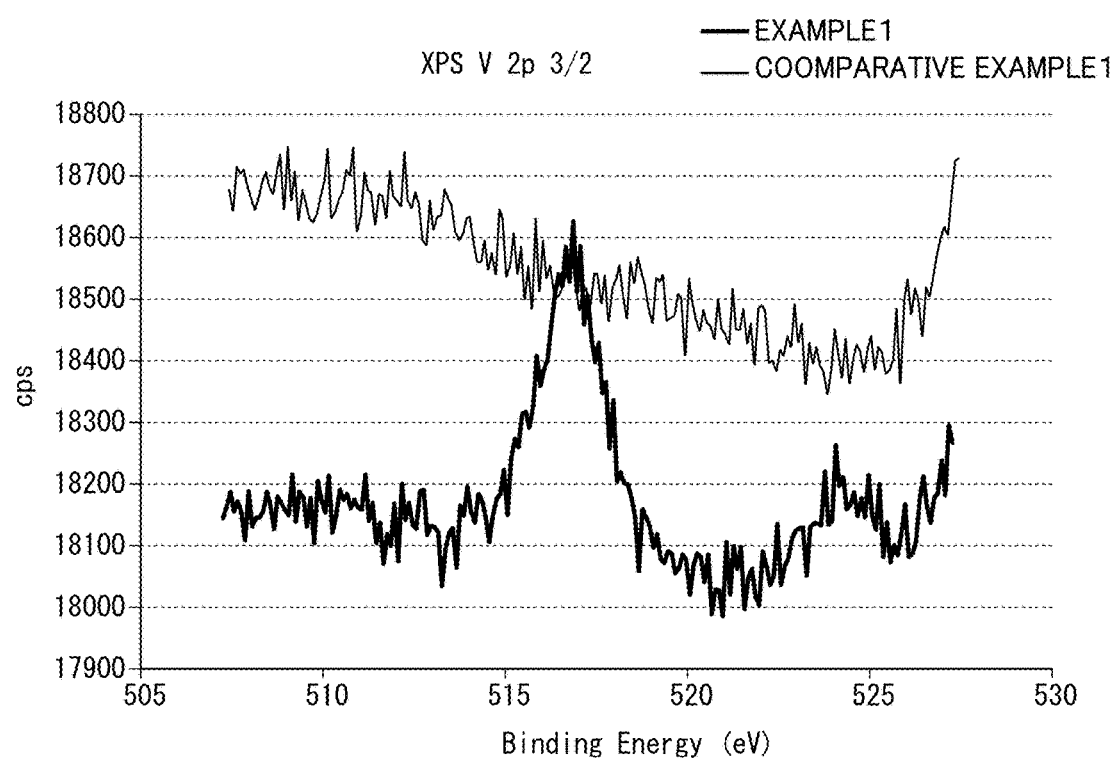
FIG. 5 shows the measurement results of X-ray photoelectron spectroscopy in Example 1 and Comparative Example 1.

The measurement results of X-ray photoelectron spectroscopy in Example 1 and Comparative Example 1 are shown in FIG. 5. The measuring apparatus and the measurement conditions were the same as the apparatus and the conditions described above. As a result, with respect to the capacitor anode of Example 1, a peak derived from vanadium oxide was observed in the vicinity of 516 eV in the photoelectron spectrum of V2p3/2 electrons. In other words, it can be confirmed that vanadium oxide is deposited on the dielectric film. On the other hand, no peak was observed in Comparative Example 1 where the deposition process of vanadium oxide was not performed.

Reference Examples 1 to 2

As a capacitor anode, a tantalum sintered body was used, which was different from that of Example 1. More specifically, 64 anode bodies were prepared for each example in the same manner as in Example 1 with the exceptions that molded bodies were produced using a commercially available tantalum powder of 100,000 μF·V/g as a granulated powder and sintered at 1,360° C. The mass of the anode bodies excluding the lead wires was 64±3 mg.

The chemical conversion, the deposition operation and the formation of the semiconductor layer were carried out in the same manner as in Example 1. The concentration of the aqueous vanadium pentoxide solution in the deposition operation is described in Table 2.

The average capacitance of 64 elements in each Example (120 Hz, bias 2V) and the value obtained for the mass of the semiconductor layer from an average of 10 elements are both described in Table 2.

TABLE 2

| | Concentration of aqueous divanadium pentoxide solution (% by mass) | Number of operations for formation of semiconductor layer composed of conductive polymer (times) | Mass of semiconductor layer (mg) | Capacitance (μF) | V/(V + W)*2 (mass ppm) |
|---|---|---|---|---|---|
| Ref. Ex. 1 | 0.05 | 6 | 3.3 | 468 | 28 |
| Ref. Ex. 2 | 0.0 | 6 | 3.5 | 476 | 0.4 |

*2Mass ratio of vanadium element relative to the total of vanadium element and tungsten element When comparing Reference Examples 1 and 2, in the case of using the anode body employing a tantalum sintered body, it can be seen that no effect due to the deposition operation of vanadium oxide is observed. That is, the problem that the semiconductor layer is not easily formed is an inherent problem with the tungsten sintered body.

INDUSTRIAL APPLICABILITY

The capacitor anode of the present invention is suitable for use as a solid electrolytic capacitor in various fields such as mobile phones, personal computers, or the like.

REFERENCE SIGNS LIST

1: dielectric film; 2: tungsten sintered body; 2a: tungsten powder; 3: anode lead wire; 10: capacitor anode; 21: semiconductor layer; 22: electrical conductor layer; 20: counter electrode; 23: cathode lead wire; 100: solid electrolytic capacitor element; 200: resin sheath; 300: anode terminal; 400: cathode terminal; 410: conductive adhesive layer; 1,000: solid electrolytic capacitor

The invention claimed is:

1. A capacitor anode comprising:
   a tungsten sintered body; and
   provided with a dielectric film on a surface,
   wherein vanadium oxide is deposited on a surface of the dielectric film.

2. The capacitor anode according to claim 1, wherein the vanadium oxide is divanadium pentoxide.

3. The capacitor anode according to claim 1,
   wherein a content of vanadium element is from 0.002 to 0.2% by mass with respect to the total content of vanadium element and tungsten element.

4. The capacitor anode according to claim 1,
   wherein the vanadium oxide is deposited within a range from the surface of the dielectric film to 5 nm.

5. The capacitor anode according to claim 1, wherein at least a portion of the tungsten sintered body is silicified.

6. A solid electrolytic capacitor element, wherein a semiconductor layer is further laminated on top of a dielectric film of the capacitor anode according to claim 1.

7. A solid electrolytic capacitor comprising the solid electrolytic capacitor element according to claim 6.

8. A method for producing a capacitor anode,
   the method comprising a deposition step for depositing vanadium oxide on a surface of a dielectric film of a capacitor anode including a tungsten sintered body and provided with the dielectric film on a surface.

9. The method for producing a capacitor anode according to claim 8,
   wherein the deposition step comprises
   an immersion step for immersing the tungsten sintered body after a chemical conversion step in an aqueous solution obtained by dissolving vanadium oxide, and
   a drying step for drying the tungsten sintered body after immersion.

10. The method for producing a capacitor anode according to claim 9,
    wherein the drying step comprises
    a first drying step performed at a temperature of 100° C. to 120° C., and
    a second drying step performed at a temperature of 190° C. to 300° C.

* * * * *